July 27, 1937.  A. H. LLOYD ET AL  2,088,379
MANUFACTURE OF TOOLS FOR TRUING GRINDING WHEELS
Filed May 15, 1936   2 Sheets-Sheet 2
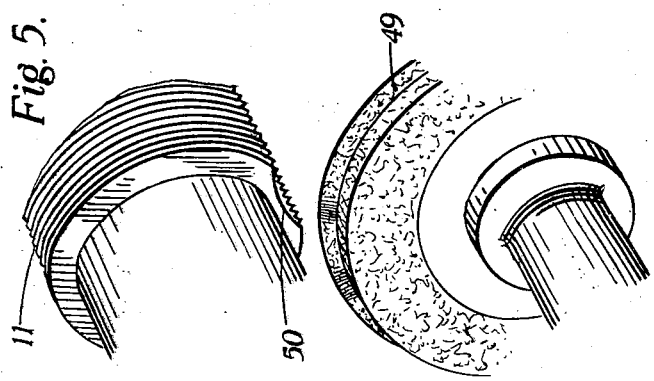
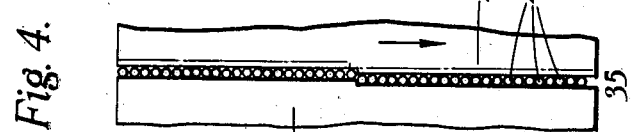
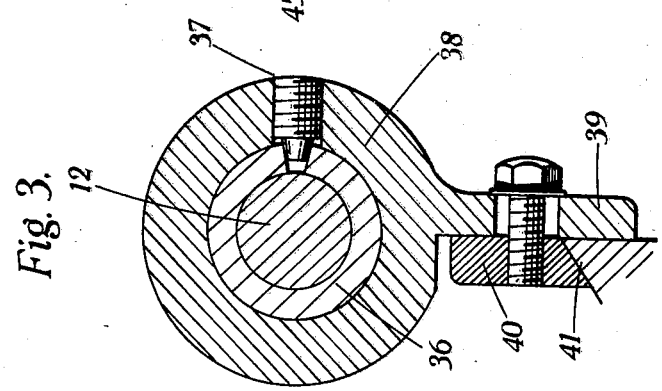
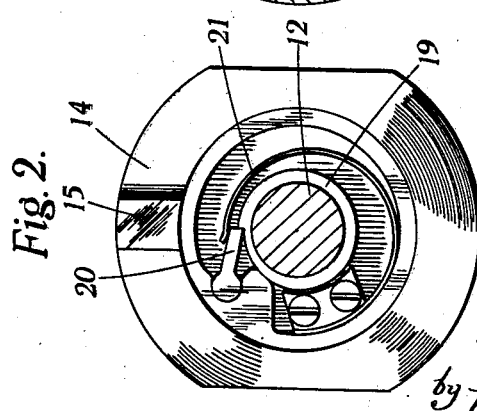
Inventors
Arthur H. Lloyd
and Harry Booth
by Mawhinney & Mawhinney
Attorneys.

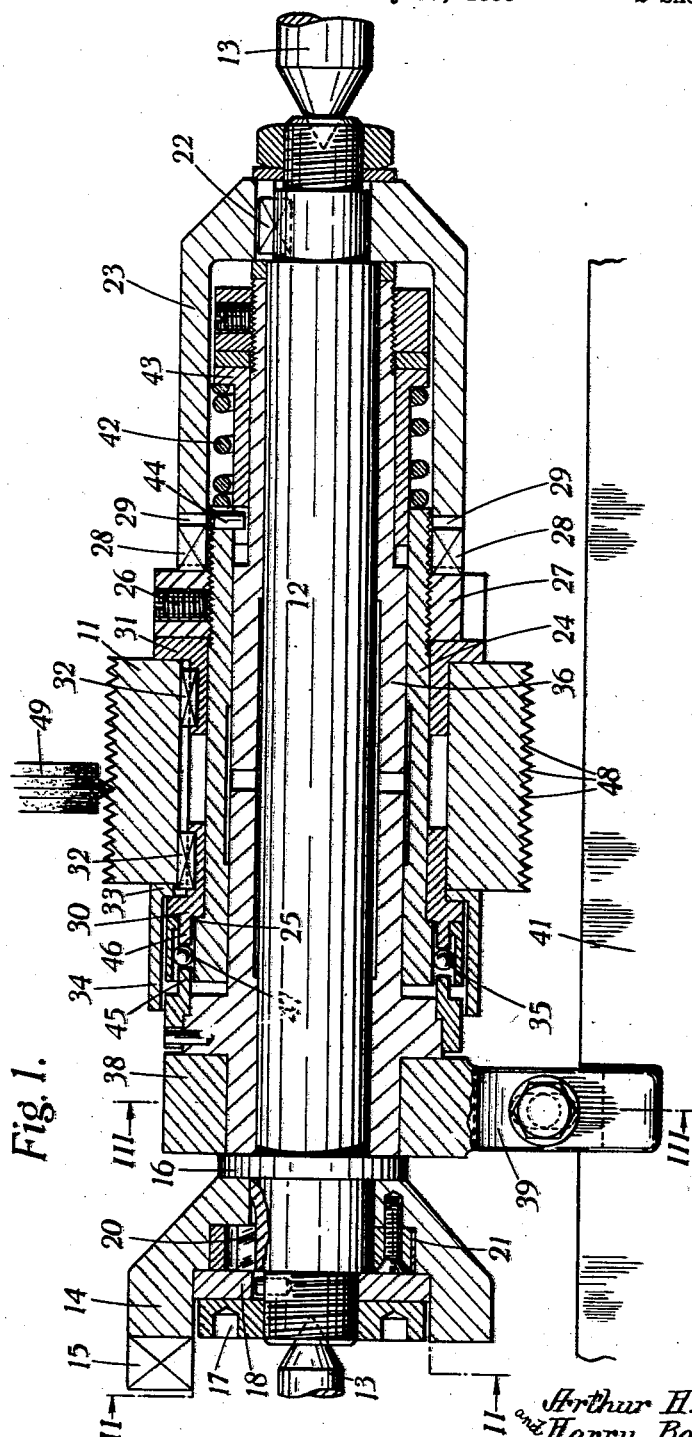

Patented July 27, 1937

2,088,379

UNITED STATES PATENT OFFICE 2,088,379

MANUFACTURE OF TOOLS FOR TRUING GRINDING WHEELS

Arthur Harold Lloyd and Harry Booth, Coventry, England

Application May 15, 1936, Serial No. 79,982
In Great Britain February 24, 1936

5 Claims. (Cl. 51—105)

Our main object is to provide in an improved manner for accurately forming annular grooves and ridges on a cylinder with a longitudinal surface groove (such cylinder being hereinafter referred to as a disc tool) such as is intended for truing grinding wheels for use in correcting screw-threads, or for forming a screw-thread milling-cutter.

The method of the invention includes rotating the disc tool, effecting continuous relative axial feeding between the disc tool and the forming tool therefor at the rate of one groove of the disc tool for each complete revolution thereof, axially moving back the tools relatively to one another at the rate of feed during the main part of a complete revolution of the disc tool so that the tools remain axially stationary relatively to one another during this period, and effecting relative axial movement of the tools, to the position they would have been in had they not been moved back, while the longitudinal groove in the disc tool is adjacent the forming tool.

In the accompanying drawings:—

Figure 1 is a longitudinal section through one form of apparatus according to the invention for supporting and operating a disc tool relatively to an axially-stationary forming tool;

Figure 2 is a sectional end view, taken on the line II—II of Figure 1, of the driving end of the apparatus;

Figure 3 is a cross-section of the apparatus taken on the line III—III of Figure 1;

Figure 4 is a half-scale developed view of the cam means of Figure 1 for feeding back the tools relatively to one another; and Figure 5 is a fragmentary perspective view of the tools, these being shown axially apart from one another.

The drawings show the support for the disc tool 11 as including a shaft 12 mounted in the centres 13, 13 for rotation. The driving end of the shaft has a collar 14, formed with a driving dog 15, endwise located upon it against the shoulder 16 by the nut 17 and washer 18. The collar is connected to the shaft by a one-way driving device which includes a ratchet ring 19 formed integrally on the shaft and a pawl 20 on the collar pressed into engagement with the ratchet ring by the spring 21. The centres 13, 13 and the rotational means (not shown) for the driving dog 15 are adapted to be fed axially at the predetermined rate, i. e., at the rate of one ridge of the disc tool for each complete revolution thereof, in a well understood manner, as in the case of a lathe or like machine-tool.

Keyed at 22 to the other end of the shaft is a sleeve 23 which is mainly spaced therefrom and has a driving and sliding connection with a carrier for the disc tool 11. The carrier consists mainly of a sleeve 24 formed at one end with a shoulder 25 and having secured at its other end, as by a grub screw 26, a screwed ring 27. This latter has fast on it dogs 28 in sliding and driving connection with dogs 29 on the sleeve 23. Mounted against the shoulder 25 and the ring 27, respectively, are flanged rings 30, 31 keyed at 32 to the disc tool 11 which is thus located on and locked to the carrier sleeve. 33 indicates a spacer having a sleeve portion 34 serving for enclosing cam means 35.

The carrier sleeve 24 is journalled and axially slidable upon a non-rotatable support 36 in which the shaft 12 is journalled and endwise located.

Figure 3 shows the non-rotatable support 36 as being pinned at 37 to the ring 38. The tail 39 of the ring and the block 40 bolted to it together provide a V-slot to slidingly engage the V-edge of a stationary support 41.

A spring 42 is arranged in the interior of the sleeve 23 between one end of the carrier sleeve 24 and an abutment 43 endwise located on the non-rotatable support 36, the abutment 43 being slidably keyed at 44 to the carrier sleeve 24. At the other end of the non-rotatable support 36 the cam means 35 is provided, this conveniently including a profile ring 45 held to the non-rotatable support and engaging a corresponding profile ring 46, secured to the carrier sleeve 24, through an anti-friction thrust means shown as a plurality of balls 47.

The arrangement is such that during a complete revolution of the shaft 12 and disc tool 11 the latter is moved axially (relatively to the shaft and to the non-rotatable support 36) by the cam means 35 against the pressure of spring 42 a distance equal and opposite to the extent to which the shaft 12 and the non-rotatable support 36 are fed, so that actually the disc tool 11 remains stationary in space while one of the annular grooves 48 is being formed on it by the forming tool 49 which is shown as being a single-ridged grinding wheel. After one complete revolution of the disc tool 11 has almost been completed its longitudinal surface groove 50 is adjacent the forming tool 49 and at this stage the cam means 35 allows the disc tool 11 and its carrier sleeve 24 to move axially substantially instantaneously under pressure of the spring 42 relatively to the shaft 12 and non-rotatable support 36 a distance equal to the distance between the annular grooves 48 of the disc tool 11. The direction of feeding is assumed to be to the left in Figure 1, and with the cam means 35 arranged as shown in Figure 4, and with the carrier sleeve 24 rotated in the direction of the arrow, the cam means acts to displace the carrier sleeve 24 at a uniform rate to the right until the cam means assumes the position shown in Figure 4, when the spring 42 has just returned the carrier sleeve in the feeding direction while the surface groove 50 of the disc tool is in juxtaposition to the forming tool. The maximum displacement to the right of the carrier sleeve 24 is indicated by the chain lines. Thereupon the next annular groove is formed.

What we claim as our invention and desire to secure by Letters Patent of the United States is:—

1. Apparatus for accurately forming annular grooves on a disc tool having a longitudinal surface groove, comprising a forming tool, means for rotating the disc tool, means for effecting continuous axial feeding between the disc tool and said forming tool at the rate of one groove of the disc tool for each complete revolution thereof, means for holding the tools axially relatively to one another during the main part of a complete revolution, so that during this period the tools remain axially stationary relatively to one another, and means for effecting relative axial movement of the tools, to the position they would have been in had they not been held relatively to one another, while the longitudinal groove in the disc tool is in juxtaposition to the forming tool.

2. Apparatus for accurately forming grooves on a disc tool having a longitudinal surface groove, comprising an endwise-located forming tool, a shaft, means for rotating and feeding the shaft axially at a predetermined rate, a carrier for the disc tool, the carrier being in driving connection with and axially slidable with respect to the shaft, means for moving the carrier axially in the direction opposite to that in which the shaft is fed and at the rate of feed during the main portion of one complete revolution of the disc tool and for releasing said carrier when the longitudinal surface groove of the disc tool is in juxtaposition to the grinding tool, and means for urging the carrier axially relatively to the shaft in the feeding direction to move said carrier when the longitudinal surface groove of the disc tool is in juxtaposition to the forming tool.

3. Apparatus for accurately forming annular grooves on a disc tool having a longitudinal surface groove, comprising a forming tool which is endwise located and co-acts with the disc tool, an axially-slidable non-rotatable support, a carrier, for the disc tool, axially slidable and rotatable with respect to the support, means for rotating the carrier, means for feeding the support axially at a rate of one groove of the disc tool for each complete revolution thereof, and means for moving the carrier axially relatively to the support in the direction opposite to that in which the support is fed and at the rate of feed during the main part of a complete revolution of the disc tool, and for substantially instantaneously moving the carrier axially relatively to the support in the feeding direction when the longitudinal surface groove of the disc tool is adjacent the forming tool.

4. Apparatus for accurately forming annular grooves on a disc tool having a longitudinal surface groove, comprising a forming tool which is endwise located, an axially-slidable non-rotatable support, a carrier for the disc tool which is rotatable in unison therewith and axially slidable on the support, means for rotating the carrier, means for feeding the support axially at a rate of one groove of the disc tool for each complete revolution thereof, and cam means for moving the carrier axially relatively to the support in the direction opposite to that in which the support is fed and at the rate of feed during the main part of a complete revolution of the carrier, and for moving the carrier axially relatively to the support in the feeding direction when the longitudinal surface groove of the disc tool is adjacent the forming tool.

5. Apparatus for accurately forming grooves on a disc tool having a longitudinal surface groove, comprising an endwise fast V-edged rotary grinding wheel, a carrier for the disc tool which is rotatable in unison therewith, an axially-slidable non-rotatable support for the carrier, the carrier being axially slidable and rotatable on the support, means for rotating the carrier, means for feeding the support axially at a predetermined rate, profile means on the carrier and support co-acting to move the carrier axially relatively to the support oppositely to the direction of feeding at the same rate during the main part of a complete revolution of the carrier, and spring means stressed during this axial movement of the carrier, the spring means acting for moving the carrier relatively to the shaft in the direction of feeding when the profile means is in an appropriate position corresponding to the longitudinal surface groove of the disc tool being adjacent the grinding wheel.

ARTHUR H. LLOYD.
HARRY BOOTH.